March 4, 1941.  R. A. WITTMANN  2,233,659
APPARATUS FOR CONTROLLING FLUID FLOW
Filed June 26, 1939  3 Sheets-Sheet 1
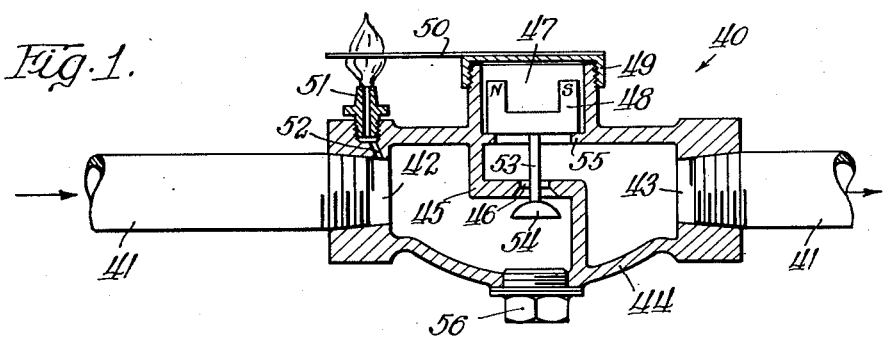
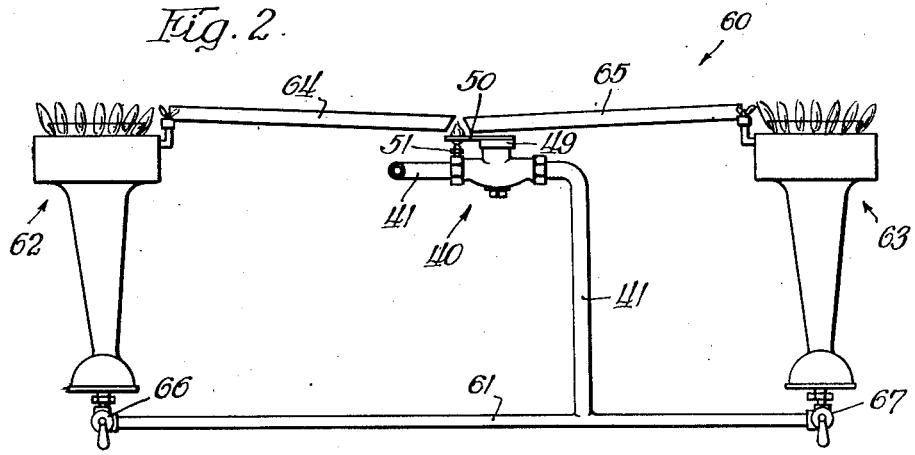
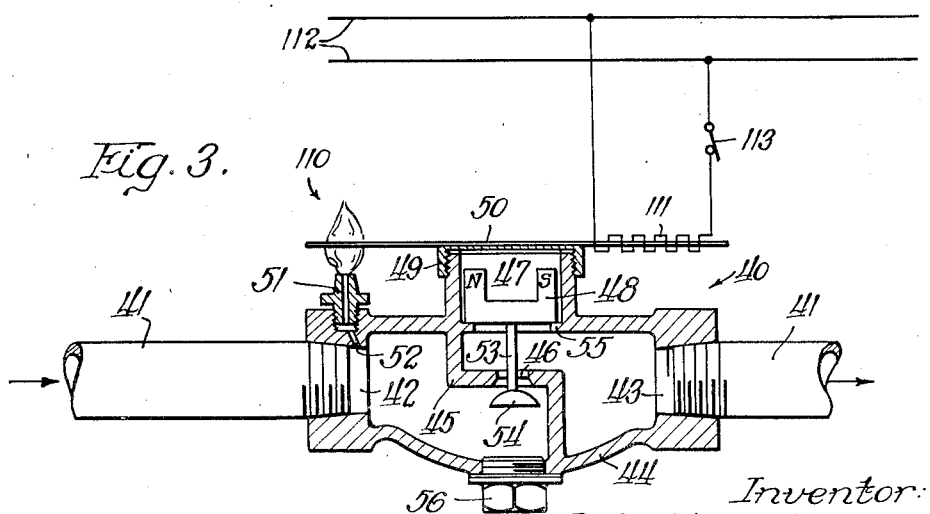
Inventor:
Robert A. Wittmann March 4, 1941.  R. A. WITTMANN  2,233,659
APPARATUS FOR CONTROLLING FLUID FLOW
Filed June 26, 1939  3 Sheets-Sheet 2
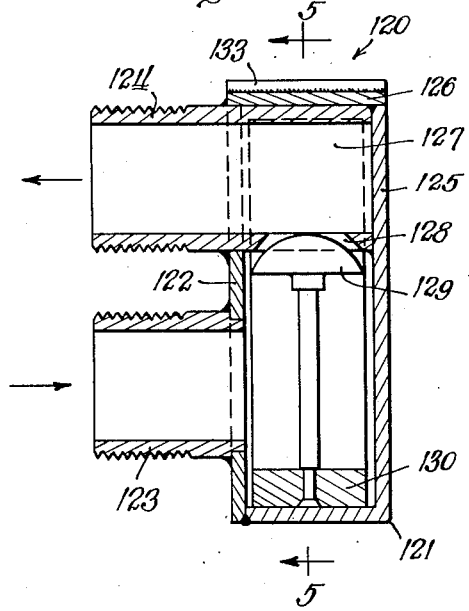
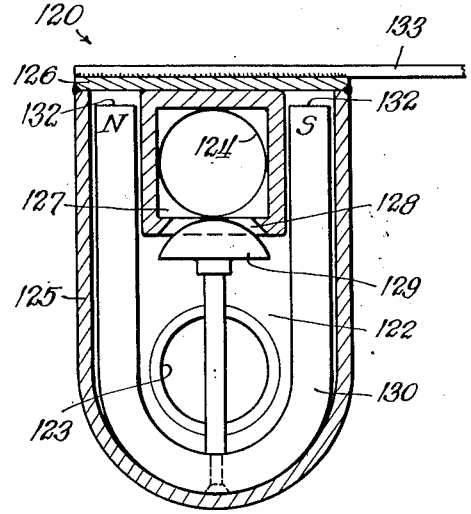
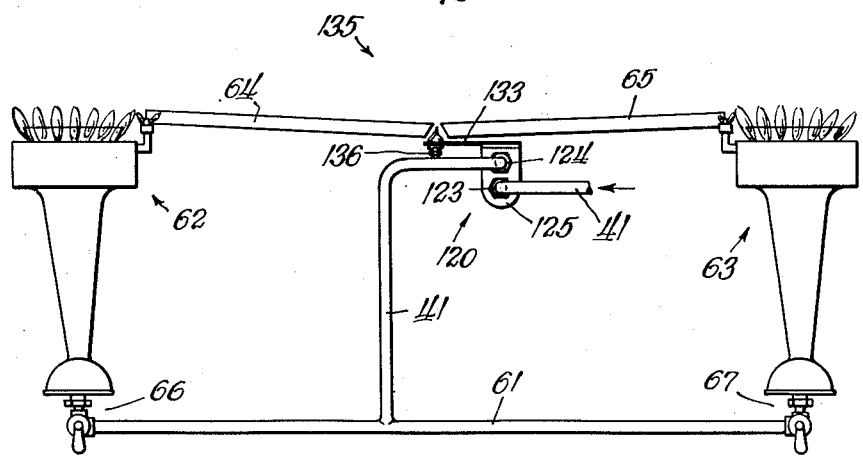
Inventor:
Robert A. Wittmann

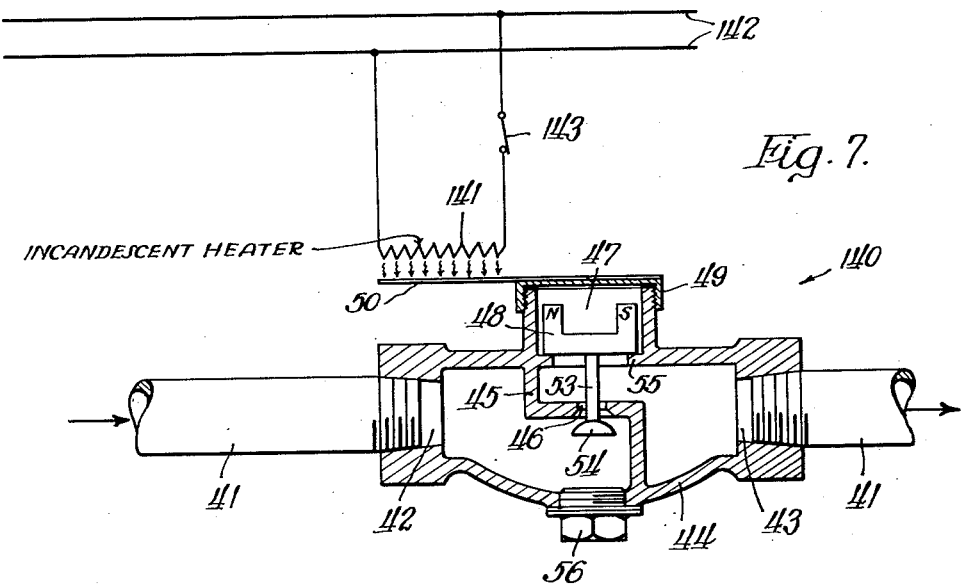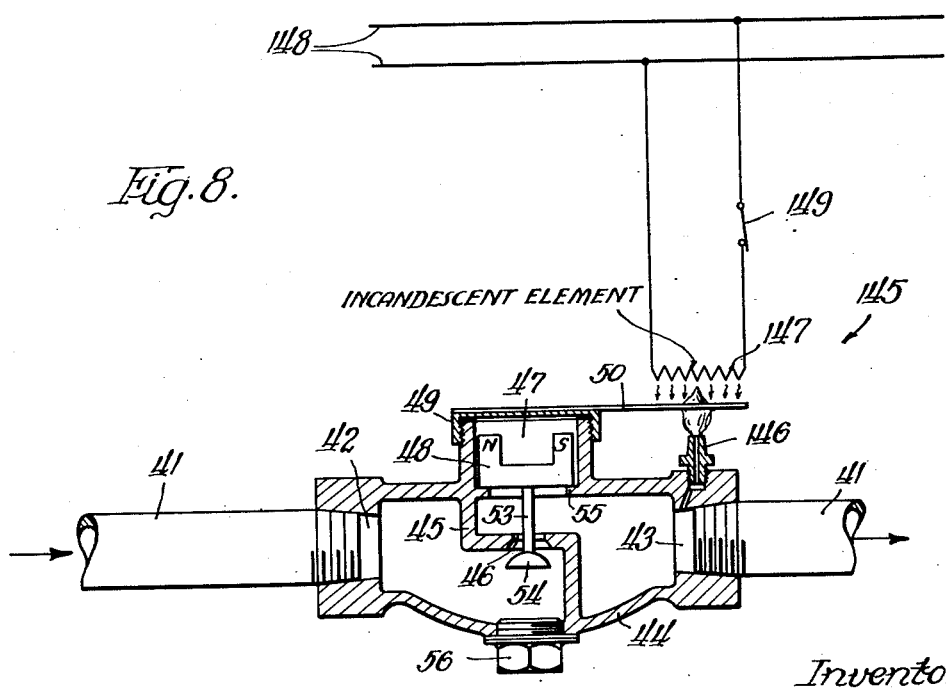

Patented Mar. 4, 1941

2,233,659

UNITED STATES PATENT OFFICE 2,233,659

APPARATUS FOR CONTROLLING FLUID FLOW

Robert A. Wittmann, Chicago, Ill., assignor to Chicago By-Products Corporation, a corporation of Illinois Application June 26, 1939, Serial No. 281,067

9 Claims. (Cl. 158—117.1)

My invention relates generally to apparatus for controlling fluid flow and it has particular relation to valves operated in response to change in the magnetic character of Curie point metals. This application is a continuation in part of my copending application, Serial No. 228,494, filed September 6, 1938.

Curie point metals include those metals and alloys which normally are ferromagnetic but which when heated sufficiently become substantially nonmagnetic. The transition temperature, or Curie point as it is called, at which this change in magnetic characteristics occurs on heating is a distinct property of each particular Curie point metal. For example, the Curie point of nickel is 350° C. and it is at the same temperature on heating or cooling. The addition of 2% chromium lowers the Curie point temperature and causes it to take place over an interval of temperature, 240° C.–280° C., on heating. In contrast the Curie point temperature of cobalt is 1100° C. Thus it is seen that Curie point metals with practically any desired Curie point or transition temperature may be obtained by employing various metals and alloys.

Valves controlled by changes in magnetic character of Curie point metal have certain inherent desirable features. They have the snap action of solenoid operated valves but are not dependent on a current source for continuous operation and since these valves are simple in construction and operation and therefore unusually dependable, they find wide application where these safety features are desired.

The object of my invention, generally stated, is to control fluid flow in response to the change in the magnetic character of a body of Curie point metal by changing the temperature thereof.

An important object of my invention is to control the flow of fluid fuel in a conduit in such manner that when a body of Curie point metal is heated above its Curie point by an incandescent pilot element, flow through the conduit will be permitted, and when the pilot element is cooled below incandescence the body of Curie point metal will cool below its Curie point and the flow through the conduit will be stopped.

Another important object of my invention is to control the flow of fluid fuel in a conduit so that, when a body of Curie point metal is heated above its Curie point by a pilot flame fed with the fluid fuel, flow through the conduit will be permitted, and when the pilot flame is extinguished the body of Curie point metal will cool below its Curie point and flow through the conduit will be stopped.

Another important object of my invention is to provide control means for a valve which will be opened and remain open when a body of Curie point metal is heated above its Curie point, and which will be closed and remain closed when the same body of Curie point metal is below its Curie point, which comprises an incandescent heater selectively controlled for initially heating the body of Curie point metal above its Curie point, and a pilot burner which becomes ignited by the incandescent heater when the valve is opened, the pilot burner maintaining the body of Curie point metal above its Curie point when the incandescent heater is turned off, and the valve closing when the pilot burner goes out.

Another important object of my invention is to selectively control fluid fuel flow to a burner by opening or closing an electric circuit, the flow being prevented if the pilot burner for the main burner becomes extinguished.

Still another object of my invention is to provide Curie point metal operated valves of improved design.

Other objects of my invention will, in part, be obvious and in part appear hereinafter.

Accordingly, my invention is disclosed in the embodiments thereof shown in the accompanying drawings, and it comprises the features of construction, the combination of parts, and arrangement of elements which will be exemplified in the construction hereinafter set forth and the scope of the application of which will be indicated in the appended claims.

For a more complete understanding of the nature and scope of my invention, reference may be had to the following detailed description, taken in conjunction with the accompanying drawings, in which:

Figure 1 is a longitudinal vertical section of a valve illustrating one embodiment of my invention;

Figure 2 shows the valve of Figure 1 applied for operation as an element of a gas range installation;

Figure 3 is a longitudinal vertical sectional view of a modification of the valve of Figure 1;

Figure 4 is a vertical sectional view of a valve illustrating another embodiment of my invention;

Figure 5 is a view taken on line 5—5 of Figure 4;

Figure 6 is a view similar to Figure 2, showing the valve of Figures 4 and 5 similarly applied for operation on a gas range installation;

Figure 7 is a longitudinal vertical sectional view of another modification of the valve of Figure 1; and Figure 8 is a longitudinal vertical sectional view of a modification of the valve of Figure 7.

Referring now to Figure 1 of the drawings, a heat operated safety valve is shown generally at 40 which will stop the gas supply to a gas burner in case the pilot therefor goes out. The valve 40 may be located in a gas line 41, for controlling the gas flow therein, with its inlet 42 and outlet 43 connected in the line 41 as shown. The valve 40 comprises a valve body 44, preferably made of nonferromagnetic material, with a baffle 45 separating the inlet 42 from the outlet 43. In the baffle 45 is a port 46 having its underside ground to form a valve seat. A chamber 47 is provided on the top of the valve body 44 and above the port 46 for holding a magnet 48 therein. The chamber 47 may be closed by a cap 49 of Curie point metal screwed thereon. A conducting strip 50 extends from the cap 49 over a pilot burner 51 which is located on the top of the inlet 42. The pilot burner 51 is fed through a small hole 52 drilled in the inlet 42 as shown. A shaft 53 depends from the magnet 48 and a valve member 54 is carried on its lower end as shown. When the ends of the poles of the magnet 48 are as nearly touching the cap 49, i. e. a few thousandths of an inch therefrom, the valve member 54 will be seated in the valve seat of the port 46 closing the same. The magnet 48, when not attracted to the cap 49, rests on a shoulder 55 which keeps it within operative distance of the cap 49. A removable plug 56 may be provided in the bottom of the valve body 44 as shown.

In order to more fully understand the operation of the valve 40 reference may be had to Figure 2 of the drawings showing generally at 60 a gas range installation employing the valve 40. The valve 40 is located in the gas supply line 41 which leads to a gas manifold 61. The manifold 61 supplies one, two, or any number of gas burners 62 and 63 which are lighted by the gas pilot 51 through the carry-over or lighting tubes 64 and 65. In order to individually control the burners 62 and 63, the manifold 61 may be provided with valves 66 and 67.

When the pilot 51 is lighted, sufficient heat will be conducted by the strip 50 to the cap 49 so that it will be heated above its Curie point and will therefore become nonmagnetic. Accordingly, the magnet 48 will not be attracted to the cap 49 and it will drop to its place of rest on the shoulder 55, thus opening the port 46. The port 46 being open, gas then may be supplied as desired to the burners 62 and 63, which will be lighted by the pilot 51. If however for some reason the pilot 51 should become extinguished, the cap 49 will then cool below its Curie point since it will be no longer heated. When the cap 49 thus cools below its Curie point and becomes ferromagnetic, the magnet 48 will be attracted thereto and the port 46 will be closed by the valve member 54, as hereinbefore described. Since the gas supply to the burners 62 and 63 is controlled by the valve 40, it is seen that it will be impossible for gas to be supplied to these burners at any time when the pilot 51 becomes extinguished.

With a view to providing a heat operated valve which will shut off the gas supply to a gas burner in case the pilot therefor goes out and which can also be selectively operated, I have provided a valve shown, generally, at 110 in Figure 3 of the drawings, which is a modification of valve 40 shown in Figure 1. The valve 110 may be exactly like valve 40 of Figure 1, except that the conducting strip 50 extends on both sides of the cap 49. An electric heating element 111 is provided to heat the strip 50 on the end opposite the pilot burner 51. The heater 111 may be connected to a pair of energized conductors 112 through a switch 113. It will be understood that the switch 113 may be positioned in any convenient location, such as a bathroom or kitchen, and may be manually or thermostatically operated. The valve 110 is so designed that the heat supply from both the pilot burner 51 and the heating element 111 is required in order to heat the cap 49 above its Curie point and allow the valve 40 to be opened. For example, the pilot burner 51 may be the pilot for a gas hot water heater and valve 110 may control the gas supply thereto, the switch 113 being remotely located such as in a bathroom. When it is desired to have hot water, switch 113 will be closed causing the cap 49 to receive heat from the heating element 111. If at the same time the pilot burner 51 is burning, then the valve 110 will open allowing gas to flow through the hot water heater which will be lighted by the pilot 51. If the pilot burner 51 is out, it will be impossible to turn on the valve 110 since the heat supply to the cap 49 from the heater 111 is alone not sufficient. When the switch 113 is opened, the heat supply from the heating element 111 will be cut out and the valve 110 will then close.

This feature described in connection with Figure 3 of controlling the operation of the valve 110 in accordance with the combination of the heat from a pilot burner and a separate selectively controlled heat source is thought to be broadly new, and it will be understood that the valve 110 is illustrative of only one embodiment of this feature. For example, the valve member 54 might be connected to a bimetallic snap disc. This disc might be heated by both the pilot burner 51 and the heating element 111 and so designed that it would require the combined heat supply of both of these sources to cause the disc to snap to the open position and thereby open the valve 110. When it is not thus heated from both sources, it would remain or snap to the closed position. This same principle of dual heat supply could also be applied to a bulb and bellows type operated valve. In this case it would require the combined heating effects of both sources to heat and expand the gas in the bellows sufficiently to open the valve and when the gas was not so heated the bellows would contract sufficiently to close the valve.

Referring now to Figures 4 and 5 of the drawings, a compact automatic heat operated safety pilot valve is shown, generally, at 120 designed for operation in connection with top burners, broiler ovens, and domestic gas stoves and gas ranges, which uses a minimum of Curie point metal. The valve 120 has a valve casing 121 which may comprise a stamping 122 having inlet and outlet nipples 123 and 124 respectively, welded or otherwise secured thereon. A second stamping 125 provides the back and sides of the casing 121 while the top may be closed by a member of Curie point metal 126. It will be understood that the nipples 123 and 124 may be fitted on opposite sides of the casing 121 if desired. The members 122, 125 and 126 may be sealed together at the edges with solder as shown to provide a gas-tight casing. If desired the members 122, 125 and 126 may have extending flanges with gaskets provided therebetween and bolted together. Instead of making the casing 121 up of several members it might be a casting. The stampings 122 and 125 are preferably made from nonferromagnetic metal such as from a zinc or aluminum base metal. The top of the casing 121 might also be closed with a nonferromagnetic member and then have the member 126 of Curie point metal secured on the top of this member outside the casing 121 or secured to the underside of the member within the casing 121. The member 126 in this case would be secured in any manner such as by soldering, brazing or clamping or otherwise secured. An outlet chamber 127 may be secured in the casing 121 between the plate 122 and the backing member 125. The chamber 127 will have a port 128 provided therein and will register with the opening provided in the stamping 122 for the outlet nipple 124. A valve member 129 is provided for closing the port 128 and is carried by a horseshoe magnet 130. The poles 132 of the magnet 130 are spaced a short distance from the body of Curie point metal 126 when the magnet 130 rests on the bottom of the member 125. When the member 126 is below its Curie point and ferromagnetic, the magnet 130 will be attracted thereto carrying the valve member 129 into a position closing the valve port 128. The valve 120 should be so designed that when the valve member 129 is in the closed position the poles 132 will be a few thousandths of an inch from the member 126. When the member 126 is heated above its Curie point and nonmagnetic, the magnet 130 will drop therefrom and rest in the bottom of the casing 121, thereby opening the valve port 128. The heat conductive strip 133 may be secured to the member 126 of Curie point metal as shown.

In order to more fully understand the operation of the valve 120 an application thereof will be described in connection with Figure 6 of the drawings. In the Figure 6 a gas range installation is indicated generally at 135 which corresponds to the installation 60 of Figure 2 except for having the valve 40 replaced with valve 120. When the pilot 136 is lighted sufficient heat will be conducted by the strip 133 to the member 126 so that it will be heated above its Curie point and will therefore be nonmagnetic. The magnet 130 will not be attracted to the member 126 but will be resting in the bottom of the casing 121, thus opening the valve port 128. The valve port 128 being opened, gas will be supplied to the burners 62 and 63, which will be lighted by the pilot 136 through the carry-over or lighting tubes 64 and 65. If the pilot 136 should become extinguished the member 126 will cool below its Curie point and become ferromagnetic. The magnet 130 will then be attracted thereto and the port 128 will be closed by the valve member 129. Since the gas supply to the burners 62 and 63 is controlled by the valve 120, it is seen that it will be impossible for gas to be supplied to these burners at any time when the pilot 136 is not burning.

It will be apparent that the strip 133 may be extended on both sides of the member 126 to provide a valve similar to the valve 110 shown in Figure 3 of the drawings, that is, a safety pilot valve selectively controlled by an electric circuit.

In some instances it may be desirable to substitute an incandescent electric heater for a pilot burner. Referring to Figure 7 of the drawings, a valve is shown generally at 140 embodying such an incandescent electric heater. The valve 140 is the same as valve 40 of Figure 1, except that the pilot 51 is replaced by an incandescent heater 141 for heating the conductive strip 50. The heater 141 is connected for energization from a pair of energized conductors 142 through a switch 143. The valve 140 is designed in such manner that when the switch 143 is closed and the heater 141 is heated to incandescence, the cap 49 of Curie point metal will become heated above its Curie point, allowing the magnet 48 to drop and thereby open the valve port 46. When the switch 143 is opened, the heater 141 will cool below incandescence, thereby allowing the cap 49 to cool below its Curie point, whereupon the magnet 48 will be attracted thereto, thus closing the valve 140.

In operation the heater 141 is positioned so as to ignite the gas supplied to the main burners controlled by the valve 140. That is, the heater 141 constitutes a pilot element. For instance, the valve 140 may replace valve 40 in Figure 2 of the drawings. The switch 143 may be manually operated, or may be controlled by thermostatic means, or any other desired arrangement. When the switch 143 is open, or at any time when the heater 141 is not heated to the predesigned degree of incandescence, the valve 140 will be closed.

A further application of the incandescent pilot element described above in connection with Figure 7 is illustrated by the safety valve 145 shown in Figure 8 of the drawings. In general construction the valve 145 corresponds to valve 40 of Figure 1. However, the pilot 51 of valve 40 is replaced by a pilot 146 provided in the outlet side of the valve 145. An incandescent heating element 147 is provided adjacent the conductive strip 50, in position to ignite the pilot 146 when gas is flowing therethrough. The heater 147 may be energized from the energized conductors 148 through a control switch 149, as shown. When the pilot 146 is out, and the switch 149 is open, no heat will be supplied through the conductive strip 50 to the cap 49 of Curie point metal, which will then be ferromagnetic and attract the magnet 48 thereto and close the valve 145.

The valve 145 is so designed that when the switch 149 is closed the heater 147 will become heated to incandescence and thereupon sufficient heat will be conducted to the cap 49 to heat it above its Curie point. When the cap 49 is heated above its Curie point the magnet 48 will drop therefrom, thereby opening the valve port 46 and allowing gas to flow through the valve 145. When the gas begins to flow through the valve 145, gas will be supplied to the pilot 146, which will become ignited by the incandescent heater 147. At this time the switch 149 may be opened, allowing the heater 147 to cool, while the pilot flame provides sufficient heat to maintain the cap 49 above its Curie point. The pilot 146 is positioned so that the pilot flame will ignite whatever main burners are controlled by the valve 145. It is seen that the control switch 149 need only be closed for the short period required to open the valve 145 and ignite the pilot 146. The control switch 149 may be manually operated, or by any of the automatic time delay means as are well known in the art. For example, it may be controlled by a time delay switch operated in response to a thermostatic device. If for any reason, the pilot 146 should go out, the cap 49 will cool below its Curie point, whereupon the valve 145 will be closed.

It will be noted that valve 120, of Figures 4 and 5, is essentially the valve 40 of Figure 1, provided in a preferred design. That is, the operation of these valves are substantially the same. Likewise, valve 110, of Figure 3, valve 140, of Figure 7, and valve 145, of Figure 8, may be provided in this or other design.

As pointed out hereinbefore, the temperature sensitive members of Curie point metal may be selected with practically any desired magnetic characteristics. Thus, if a valve is operating where normally the ambient temperature is high, the body of Curie point metal must have a correspondingly high transition temperature so that it will become magnetic when not heated above the ambient temperature. However, this is a matter of design, depending upon the application to be made of the heat controlled valve in each instance.

Although in all of the foregoing embodiments of my invention the valves are normally closed when the bodies of Curie point metal are not heated above their Curie point and ferromagnetic, and are open when they are heated above their Curie point and nonmagnetic, it will be understood that by placing the valve closing members above the valve ports, instead of below them, as shown, the valves will then be normally closed when the bodies of Curie point metal are heated above their Curie point and will be open when the bodies of Curie point metal are not so heated above their Curie point. Some applications may require such a modification.

In all of the foregoing embodiments in which permanent magnets are shown or described, it will be understood that they may be replaced by electromagnets if these are desired for any reason.

Since certain further changes may be made in the foregoing construction, and different embodiments of the invention may be made without departing from the scope thereof, it is intended that all matter shown in the accompanying drawings or described hereinbefore shall be interpreted as illustrative, and not in a limiting sense.

I claim as my invention:

1. Means for controlling fluid fuel flow in a conduit comprising, in combination, valve means in the conduit including a valve member movable between open and closed positions, means for establishing a pilot flame, electrical heater means, and relatively movable cooperating magnetic members, one being a permanent magnet and the other being a body of Curie point metal, said valve member being operatively connected to and movable with one of said magnetic members, said pilot flame and electrical heating means being arranged and adapted to jointly heat said body of Curie point metal above its Curie point so long as both said pilot flame is established and said electrical heating means is in operation, whereby said valve member remains in the open position.

2. Means for controlling fluid fuel flow in a conduit comprising, in combination, valve means in the conduit including a valve member movable between open and closed positions, means for establishing a pilot flame, electrical heater means, relatively movable cooperating magnetic members, one being a permanent magnet and the other being a body of Curie point metal, said valve member being operatively connected to and movable with one of said magnetic members, and means for conducting heat from said pilot flame, so long as it remains lighted and from said electrical heating means so long as it is in operation, to said body of Curie point metal for maintaining the same above its Curie point, whereby said valve member remains in the open position until either said pilot flame is extinguished or until said electrical heating means is deenergized.

3. Means for controlling fluid fuel flow in a conduit comprising, in combination, valve means in the conduit including a valve member movable between open and closed positions, means for establishing a pilot flame, electrical heater means, magnet means operatively connected to and movable with said valve member, and a body of Curie point metal stationarily mounted in the field of said magnet means, said pilot flame and electrical heating means being arranged and adapted to jointly heat said body of Curie point metal above its Curie point so long as both said pilot flame is established and said electrical heating means is in operation, whereby said valve member remains in the open position.

4. Means for controlling fluid fuel flow in a conduit comprising, in combination, valve means in the conduit including a valve member movable between open and closed positions, means for establishing a pilot flame fed from the fuel in said conduit, electrical heater means, magnet means operatively connected to and movable with said valve member, and a body of Curie point metal stationarily mounted in the field of said magnet means, and means for conducting heat from said pilot flame so long as it remains lighted, and from said electrical heating means so long as it is in operation, to said body of Curie point metal for maintaining the same above its Curie point, whereby said valve member remains in the open position until either said pilot flame is extinguished or until said electrical heating means is not in operation.

5. A valve comprising, in combination, a fluid-tight casing with a fluid inlet and outlet, a valve port, a valve member for closing said port, a magnet operatively connected with said valve member, a body of Curie point metal disposed adjacent to the poles of said magnet, and a heat conductive strip secured to said body of Curie point metal, said magnet being attracted to said body of Curie point metal when below its Curie point and thereby holding said valve member in a position to close said port, and said body of Curie point metal being adapted to be heated above its Curie point by heat conduction through said heat conductive strip to thereby become nonmagnetic allowing said magnet to move away and carrying the valve member so as to open said port.

6. A valve comprising, in combination, a fluid-tight casing having a fluid inlet and outlet, a valve port serving to interconnect said inlet and outlet through said casing, a valve member for closing said port, a horseshoe magnet supporting said valve member, a body of Curie point metal secured to said casing adjacent to the poles of said horseshoe magnet and a heat conductive strip secured to said body of Curie point metal, said horseshoe magnet being attracted to said body of Curie point metal when below its Curie point to thereby hold said valve member in a position closing said port, and said body of Curie point metal being adapted to be heated above its Curie point by heat conduction through said heat conductive strip, thereby becoming nonmagnetic and allowing said horseshoe magnet to drop and carry said valve member away from said port, and said horseshoe magnet being free to move away from said body of Curie point metal when not attracted thereto.

7. A safety valve for a main burner comprising, in combination, a fluid-tight casing with a fluid inlet and outlet, a valve port, a valve member for closing said port, a magnet movably mounted within said casing and operatively connected with said valve member, a body of Curie point metal disposed adjacent to the poles of said magnet, and a pilot burner for heating said body of Curie point metal above its Curie point, said magnet being attracted to said body of Curie point metal when below its Curie point and thereby holding said valve member in a position to close said port, and said magnet moving away from said body of Curie point when above its Curie point so as to open said port.

8. A self-contained heat responsive valve comprising a closed casing having an inlet connection and an outlet connection separated by a wall within the casing, said separating wall having a valve port with a valve seat facing downwardly, a valve plug adapted to be raised to seat to shut off the flow of fluid through the port, an armature of Curie point metal attached to the casing and having a heat conducting extension adapted to conduct heat from an associated source to said armature to cause it to become substantially paramagnetic when heated, and a permanent magnet disposed within the casing and connected to said valve, said magnet gravitating downward to open the port when the armature is paramagnetic and being attracted to the armature to close the port when the armature is diamagnetic.

9. The valve of claim 8 wherein the said wall within the casing is a closed end tubular wall, and wherein the permanent magnet is a horse shoe magnet with the free limbs thereof lying on each side of said tubular wall.

ROBERT A. WITTMANN.